United States Patent [19]

Rossi

[11] Patent Number: 4,617,803

[45] Date of Patent: Oct. 21, 1986

[54] TEMPERATURE RESPONSIVE CONTROL UNITS

[75] Inventor: Guglielmo Rossi, Linkenheim/Hochstetten, Fed. Rep. of Germany

[73] Assignee: Ranco Incorporated, Dublin, Ohio

[21] Appl. No.: 539,123

[22] Filed: Oct. 5, 1983

[30] Foreign Application Priority Data

Feb. 5, 1982 [GB] United Kingdom ............... 8203376
Apr. 23, 1982 [GB] United Kingdom ............... 8211801

[51] Int. Cl.[4] .......................................... F25B 41/00
[52] U.S. Cl. ............................... 62/209; 62/229; 337/308; 219/513
[58] Field of Search ............... 62/209, 211, 156, 229; 337/307, 308, 309; 236/78 B; 219/513

[56] References Cited

U.S. PATENT DOCUMENTS 2,266,799 12/1941 Rawey ...................... 62/209 X
2,900,802 8/1959 Bagnall ........................ 62/209 X

FOREIGN PATENT DOCUMENTS 498866 1/1939 United Kingdom .
549730 5/1941 United Kingdom .
536675 5/1941 United Kingdom .
547978 9/1942 United Kingdom .
639683 7/1950 United Kingdom .
731565 6/1955 United Kingdom .

Primary Examiner—William E. Wayner
Attorney, Agent, or Firm—Watts, Hoffmann, Fisher & Heinke

[57] ABSTRACT

A temperature controlled switching device in which a first fluid filled temperature sensor responding to the temperature of heating or cooling means moves a first lever. A second sensor sensing the room temperature moves a second lever. The two levers being interconnected to move a snap action switch for control of the heating or cooling means.

11 Claims, 8 Drawing Figures

TEMPERATURE RESPONSIVE CONTROL UNITS

This invention relates to temperature responsive control units. The invention has particular application to the control of freezers and refrigerators, but is also applicable to the control of heaters, for example, space heaters.

Essentially the present invention addresses itself to a problem which is inherently associated with the heating and cooling of air spaces, whether the air space takes the form of a closed freezer or refrigeration compartment or a room to be heated or cooled. It is a common feature of all such equipment that air circulates over a cold or hot surface—according to whether the application is one of cooling or heating—and passes into the space to be cooled or heated. The purpose of the thermostatic controls commonly associated with such equipment is to maintain the temperature in the air space within predetermined andd presettable limits. The simplest form of thermostatic control has a temperature sensing element located in the space to be heated or cooled and controls the operation of the heating or cooling means in response to the sensed temperature.

Thermostatic control by the sensing of a single temperature in this way is in general unsatisfactory, since it cannot take into account changes in the working conditions of the heating or cooling means. Conversely, if the single temperature sensing element of the thermostatic control is arranged to sense the temperature at the heating or cooling means it can take no account of temperature variations in the heated or cooled enclosure.

Thus it is known, for example, to associate a single thermostatic control with the evaporator of a freezer to control the cutting in and out of the compressor and thereby cause the evaporator temperature to cycle between predetermined temperature limits. Such cycling occurs without reference to the actual air temperature in the freezer compartment, which may be influenced by the external air temperature. If, for example, warm or fresh food has recently been introduced into the freezer compartment the air temperature will have risen significantly, but the thermostat may nevertheless cut-out the compressor when the evaporator reaches its lower temperature limit, whereas ideally the compressor should be allowed to run on in order to pull down rapidly the temperature in the freezer compartment.

To provide for fast freezing of stock newly introduced into a freezer a manual override switch is normally provided. Closure of this switch causes the compressor to run continuously, regardless of the evaporator temperature. A disadvantage of such an arrangement is that the user frequently omits to open the manual switch after a fast freeze operation, resulting in a waste of energy, or alternatively opens the switch prematurely, resulting in incorrect freezing.

A thermostat controlling a refrigerator with a single temperature sensing element responsive to the ambient temperature in the refrigerated air compartment would have the disadvantage of requiring a narrow working differential between the cut-in and cut-out temperatures, making the control difficult to manufacture and expensive. Moreover, the thermostatic control would have an undesirably high sensitivity to temporary changes in temperature in the ambient air temperature, for example upon opening the door of the refrigerator compartment, resulting in an unnecessarily high number of cycles of operation of the compressor. The thermostatic control would also have slow response to temperature stratification of the refrigerated air, which could result from changes in the air circulation due, for example, to changes in the degree of filling of the refrigerated compartment.

In a space heater of the convector type having an electrical resistance heater element in which energisation of the heater element is controlled by a thermostat having a single sensing element responsive to the ambient temperature the heater element may be run at a dangerously high temperature if, for example, the hot air outlet of the convector is obstructed, since the room temperature sensed by the thermostat may not reach the thermostat cut-off limit temperature.

The present invention has the chief object of providing a temperature responsive control unit which is capable of more precise control of the air temperature in a heated or cooled enclosure than can be obtained with a single temperature responsive element, without having recourse to two separate thermostatic controls. A further object is to provide a control unit which combines the inherent advantages of a thermostatic control having an ambient temperature sensor with those of a thermostatic control sensing the temperature of a heating or cooling element directly.

According to the present invention there is provided a temperature responsive control unit comprising a first temperature sensing element responsive to the temperature of heating or cooling means and a second temperature sensing element responsive to an ambient temperature which results from the action of the heating or cooling means, and a common switch device which is operable in one sense by the first temperature sensing element and in the opposite sense by the second temperature sensing element. The temperatures at which the switch device is operated by the two temperature sensing elements are predetermined and may be independently presettable.

The control unit according to the invention, by employing a single switch device associated with two separate temperature sensing elemengts represents a considerable reduction in overall cost and complexity compared with previously known dual-temperature thermostatic controls, which employ two or more independent thermostatically controlled switches.

According to a preferred embodiment of the invention for controlling the operation of a refrigerator or freezer equipment having an evaporator, the switch device controls the cutting-in and cutting-out of the compressor of the refrigeration circuit, the first temperature sensing element of the control unit is responsive to temperature in the immediate vicinity of the evaporator, the second temperature sensing element is responsive to air temperature in a freezer or refrigerator compartment and the switch device is opened in response to a predetermined air temperature being sensed by the second sensing element and closed in response to the sensing of a predetermined limit temperature by the first sensing element.

As applied to a refrigerator having an evaporator associated with a refrigeration compartment, the temperature responsive control unit may be arranged with the first temperature sensing element responsive to the temperature of the evaporator associated with the refrigerator compartment and with the second temperature sensing element responsive to the air temperature within the refrigeration compartment itself, so that the switch device cuts-in the compressor at a constant predetermined temperature. The two switching temperatures associated with the sensing elements would be predetermined or preset so that the compressor cuts-out when the temperature in the refrigeration compartment falls below a predetermined threshold level, while compressor cut-in occurs when the evaporator temperature in the refrigeration compartment reaches a temperature level such that defrosting would have occurred. This affords the possibility of a "no frost" refrigerator which defrosts automatically in each cycle of operation. The advantage of such an arrangement compared with the prior art is that the refrigerator air temperature is under close control and can be preselected so as to be as low as possible but still above freezing point. Such an arrangement is applicable to a two-door refrigerator, that is, equipment having separate freezer and refrigeration compartments cooled by the same refrigeration circuit.

Still applied to a two-door refrigerator having a freezer and a refrigeration compartment with respective evaporators associated therewith, the first temperature sensing element may be responsive to the temperature of the freezer evaporator and the second sensing element may be responsive to the temperature of refrigerator compartment evaporator so that closure of the switch device to cut-in the compressor occurs when the freezer evaporator reaches an upper threshold temperature (say −15° C.) and opening of the switch device to cut-out the compressor occurs when the refrigeration compartment evaporator reaches a lower threshold temperature (say −15° C.). The advantage of such an arrangement is that it results in a better control of the freezer temperature without the need for a second thermostat. In this case the air temperature in the refrigerated compartment is not kept under control.

A further application is to freezer cabinets, where the common switch device of the control unit would be arranged to cut-in the compressor of the freezer in response to the temperature in the vicinity of the evaporator of the freezer, sensed by the first temperature sensing element, and to cut-out the compressor in response to the air temperature sensed in the freezer compartment by the second temperature sensing element. This affords the possibility of "automatic fast freeze" when fresh goods to be frozen are introduced into the freezer compartment: the compressor is switched on in response to the rise in temperature in the freezer compartment sensed by the first temperature sensing element, and subsequently switched off when the temperature in the freezer compartment reaches a predetermined level, as sensed by the second temperature sensing element.

As applied to a space heater having an electrical heater element the control unit is so arranged that the first temperature sensing element is responsive to temperature immediately downstream of the heater element and the second temperature sensing element is responsive to temperature upstream of the heater element. Preferably the associated switch device is so arranged that it is closed, to switch the heater element on, only by the second temperature sensing element when the latter senses a temperature below a predetermined threshold level, and is opened, to switch the heater element off, only by the first temperature sensing element, when the latter senses a temperature in excess of a predetermined upper limit. With this arrangement a predetermined comfortable temperature level can be maintained in a room, while affording the safety feature of a constant temperature cut-out for switching off the heater element in response to an excess temperature, for example, as a result of the air outlet being covered.

Various mechanical arrangements of the control unit may be employed. For example, the first and second temperature sensing element may comprise respective bellows systems acting through respective operating levers on the switch device. In a preferred embodiment the operating lever of the first temperature sensing element acts on an operating element of the switch device through a displaceable member which has a shoulder against which the operating lever of the second temperature sensing element acts, the movement of the latter operating lever in engagement with said shoulder being limited by a stop which effectively prevents operation of the switch in the said one sense by the second temperature sensing element. The two operating levers may be acted upon by respective biassing springs in opposition to the respective temperature sensing elements, the forces exerted by the two springs being independently adjustable, for example by means of adjustable screw-anchorages, or by cam-adjustment of spring anchorages.

Some practical embodiments of the invention will be further described, by way of example only, with reference to the accompanying purely diagrammatic drawings, in which.

Throughout the drawings the same reference numerals are used to designate the same or corresponding component parts.

Figure 1:
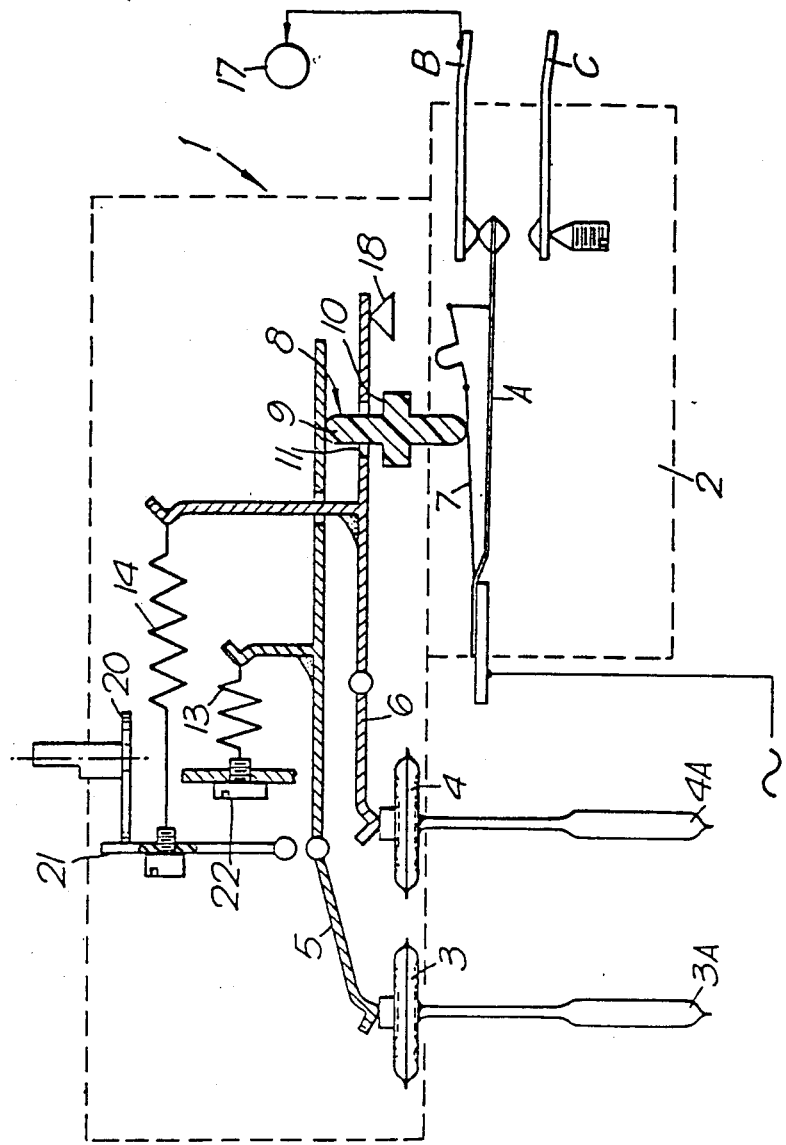
FIG. 1 shows the general arrangement of a twin bellows temperature responsive control unit according to a first embodiment of the invention, as applied to a two-door refrigerator.

Referring first to FIG. 1, a temperature responsive control unit 1 is illustrated, including a snap action switch device 2 the operation of which is controlled by two independent temperature sensors, in this case respective fluid filled bellows 3, 4 connected through capillary tubes to respective fluid-filled temperature sensing bulbs 3A, 4A as known per se. The displaceable central button of each respective bellows 3, 4 bears against one end of a respective operating lever 5, 6, each lever being independently pivoted intermediate its ends in the lateral walls of the frame (not shown) of the control unit 1. At their ends remote from the bellows 3, 4 the two levers 5, 6 act upon an operating arm 7 of the switch device 2 through a displaceable member 8.

In the control unit 1 shown in FIG. 1 the operating lever 5 cooperating with the first bellows 3 acts directly on the shank 9 of the displaceable switch operating member 8 while the operating lever 6 associated with the second bellows 4 acts upon an annular shoulder 10 of the member 8 which surrounds the shank 9, the shank 9 passing freely through an aperture 11 in the lever 6 and being freely slidable in the aperture 11 when acted upon by the lever 5.

The two levers 5, 6 are acted upon by respective tension springs 13, 14 which exert moments on the two levers in opposition to the respective bellows 3, 4 so that the levers 5, 6 are held by the springs 13, 14 in contact with the movable buttons of the respective bellows 3, 4.

The first temperature sensing bellows 3 controls the operation of the switch device 2 in one sense while the second temperature responsive bellows 4 controls the operation of the switch device 2 in the opposite sense.

The switch device 2 has a movable contact A carried by a cantilever arm which is movable with a snap action by means of the operating arm 7 and which cooperates with one of two fixed contacts B and C according to the operative state of the switch device 1. In use of the control unit in a cooling apparatus the contact A is connected to a power supply while the contact B is connected to the drive motor of the compressor 17 of the apparatus.

The sensing element 3A of the first bellows 3 is in close thermal contact with the evaporator of the refrigerator apparatus and controls closure of the switch contacts A-B to cause the cutting-in of the compressor. The sensing element 4A of the second bellows 4 is responsibe to the ambient air temperature within the refrigertor compartment and controls the opening of the switch contacts A-B to effect cutting out of the compressor 17 acting on the operating arm 7 through the operating lever 6 and the displaceable member 8.

Figure 4:
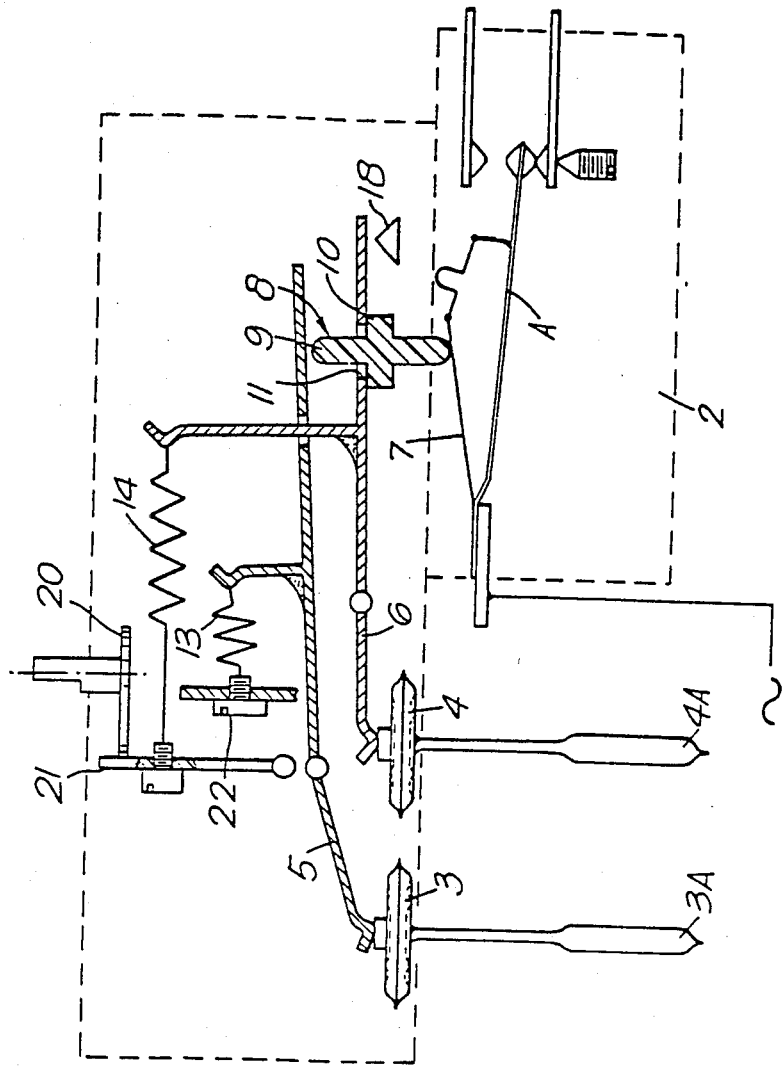
FIG. 4 illustrates the control unit of FIG. 1 in one of its operative states, following start-up.

With the compressor 17 initially switched off, the device 2 is in its condition illustrated by FIG. 4 with the contacts A-B open. As the sensed evaporator temperature increases, the lever 5 moves clockwise about its pivot (as viewed in FIG. 4) moving the arm 7 via the shank 9 of the member 8 until the compressor cut-in temperature is reached. At this time the omega shaped spring forming part of the operating arm 7 is shifted through its neutral position and snap moves the contact A from its position illustrated in FIG. 4 to its position illustrated in FIG. 1. The contacts A-B thus close and the compressor begins running. The running of the compressor 17 "pulls down" the temperature of both of the evaporator and of the air in the freezer compartment.

The resulting fall in temperature of the evaporator will result in a corresponding movement of the bellows 3 and an anticlockwise (as viewed in FIG. 1) movement of the bellows lever 5. Such movement will not, however, result in opening of the contacts A-B of the switch device 2 since the shoulder 10 of the member 8 will come into engagement with the second bellows lever 6 holding the switch contacts A-B closed.

When the temperature sensed by the second sensing element 4A in the freezer compartment falls to a predetermined "cut-out" level the resulting movement of the second bellows lever 6 (anticlockwise as viewed in FIG. 1) will cause lifting of the displaceable member 8 sufficiently to allow the contacts A-B of the switch device 2 to open, switching off the compressor 17. The contacts A-B are opened when the anticlockwise movement of the lever 6 is sufficient that the omega shaped spring of the operating arm 7 is moved through its neutral position again and snap moves the contact A into engagement with the contact C as illustrated by FIG. 4.

The evaporator and the compartment will then begin to rise in temperature. The second bellows lever 6 will then come into engagement with a fixed stop 18, preventing reclosure of the switch contacts by the action of the second bellows 4. The switch contacts A-B will only be closed when the evaporator temperature, sensed by the first bellows 3, reaches the "cut-in" level. The cycle of operations will then resume.

It will be seen that with the arrangement illustrated in FIG. 1 the cutting-in of the compressor 17, that is, the closure of the switch contacts A-B, is controlled only by the first temperature sensing element 3A, while the cutting-out of the compressor 17, that is, the opening of the switch contacts A-B, is controlled only by the second temperature sensing element 4A. The cut-out and cut-in threshold temperatures can be preset by adjustment of the tension in the springs 13, 14. These temperatures may be fixed, in which case the springs 13, 14 would have fixed anchorages on the frame of the unit or alternatively one or both of the temperature levels may be presettable; as illustrated, the spring 13 has a fixed bur presettable screw anchorage 22 in the frame of the unit while a manually adjustable cam 20 cooperating with a cam follower lever 21 forms an adjustable anchorage for one end of the tension spring 14.

In the application of the thermostatic control unit shown in FIG. 1 to a so-called two-door refrigerator having separate freezer and refrigerator compartments the control unit would be arranged with the sensing element 3A of the first bellows 3 in contact with the evaporator in the refrigerator compartment, while the temperature sensing element 4A of the second bellows 4 would be arranged in the refrigerator compartment. With such an arrangement the switch device 2 would be closed to cut-in the compressor 17 at a constant temperature, independently of the temperature in the refrigeration compartment.

Thus in the example illustrated in FIG. 1 the "cut-out" temperature sensed in the freezer compartment by the sensing element 4A is predetermined by the cam 20 which acts on the spring 14, while the cut-in temperature is preset independently by the adjustable screw anchorage 22.

The "cut-in" temperature sensed in the vicinity of the evaporator by the sensing element 3A may be slightly above freezing so as to ensure the evaporator is effectively defrosted once in each cycle of operations. Such an arrangement therefore affords, in effect, a "no frost" evaporator.

Figure 2:
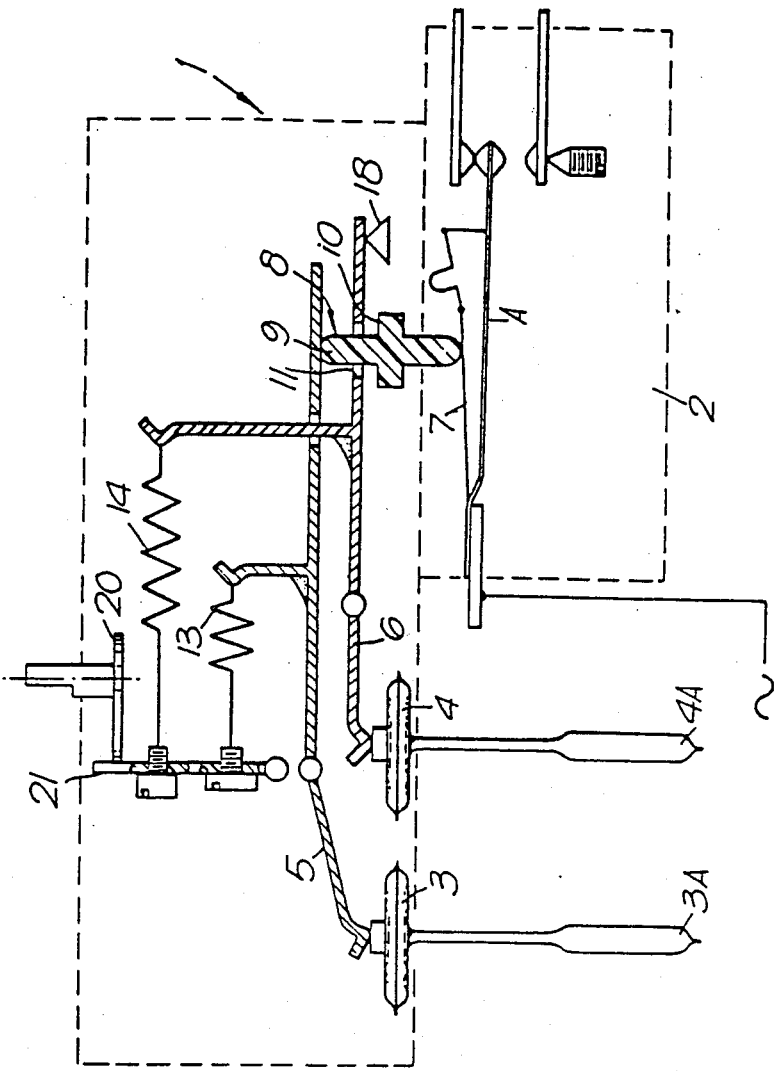
FIGS. 2 and 3 show respectively two different variants of the temperature responsive control unit shown in FIG. 1, as applied to a refrigerator and a freezer respectively.

In the application of the control unit to refrigerators in general both the cut-in and cut-out temperatures may be presettable as a function of the setting of the cam 20. Such an arrangement is illustrated in FIG. 2, in which the anchorages for both the springs 13 and 14 are carried by the cam follower element 21 and therefore adjustable simultaneously by means of the cam 20.

The operation of this refrigerator control unit will be described with reference to FIGS. 4 and 5. Upon start-up, both the evaporator and the ambient refrigerated cabinet are nominally at the same temperature (room temperature). The evaporator temperature will progressively decrease (FIG. 5), causing anticlockwise pivoting of the bellows lever 5 as the bellows 3 progressively collapses, as shown in FIG. 2. The plunger 8 will tend to follow this movement of the lever 5 until its shoulder 10 abuts the lever 6, following which the lever 5 will continue its movement, leaving the plunger 8. The bellows lever 6 associated with the ambient temperature sensing bellows 4 will remain in engagement with the fixed stop 18, holding the plunger 8 in the position in which the switch contacts A-B remain closed.

Only when the ambient temperature $T_A$ in the refrigerated compartment, as sensed by the sensing bulb 4A, falls to its predetermined (cut-out) threshold $T_O$, as determined by the tension in the spring 14, will the bellows lever 6 move away from the stop 18, allowing movement of the plunger 8 such as to cause opening of the switch contacts A-B, as illustrated in FIG. 4 and switching off the compressor 17. In the meantime the temperature of the evaporator $T_E$, will have dropped to an uncontrolled low value, $T_{EM}$ FIG. 5), resulting in a clearance between the lever 5 and the plunger 8.

Following the switching off of the compressor 17 the evaporator temperature begins to rise, until it reaches the 'cut-in' threshold $T_i$, predetermined by the tension in the spring 13, when the resulting clockwise movement of the bellows lever 5 will cause re-closure of the switch contacts A-B through the plunger 8. During this time the ambient temperature $T_A$ will also have risen by a certain, uncontrolled, amount (FIG. 5) and the associated bellows lever 6 will move clockwise, without engaging the shoulder 10 of the plunger 8, until it is arrested by the stop 18.

The cooling cycle then repeats, to be terminated when the ambient temperature $T_A$ again reaches the 'cut-out' threshold $T_O$. During this and subsequent cooling cycles, however, the evaporator temperature $T_E$ will not fall to the low value $T_{EM}$ of the first cycle, since the ambient temperature $T_A$ will have begun the cycle at a lower temperature. As the control unit effects successive switching cycles the ambient temperature $T_A$ will gradually stabilise at a temperature close to the cut-out threshold $T_O$ while the evaportor temperature modulates between the cut in threshold $T_i$ and a lower temperature which will be a function of the cooling demand.

With reference to FIGS. 2 and 4 it will be noted that:

(i) the bellows 3 can operate the switch contacts A-B in a closing, contact-making, sense only (for compressor cut-in in this embodiment)

(ii) the bellows 4 can operate the switch contacts A-B in an opening, contact-breaking, sense only (for compressor cut-out in this embodiment)

Figure 5:
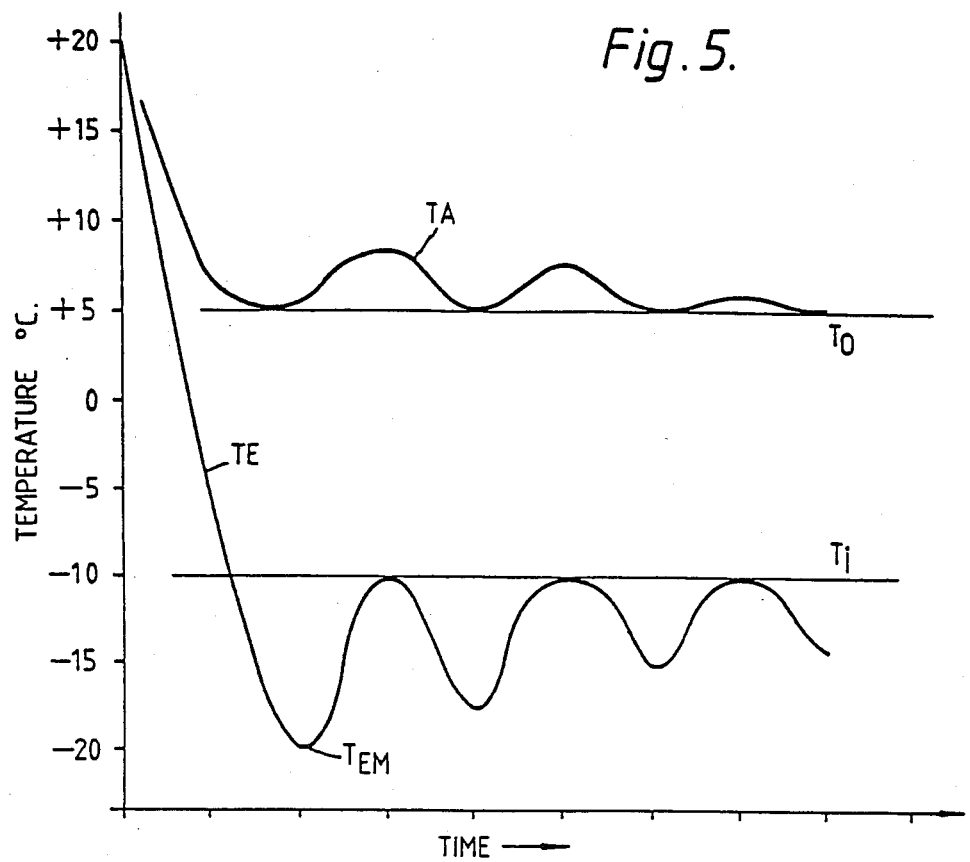
FIG. 5 illustrates graphically the progressive temperature changes in a refrigerator controlled by the control unit of FIG. 4.

(iii) the predetermined threshold temperatures $T_i$ and $T_O$ can differ widely, according to the operating requirements (see FIG. 5)

(iv) the control unit behaves like a thermostate responsive to ambient temperature, but the presence of the separate evaporator temperature sensor 3A results in the thermal inertia, so that the unit is not unduly sensitive to sudden changes of ambient temperature due, for example, to opening of the door of the refrigerated compartment (v) the first cycle of the control unit on start-up (FIG. 5) will cool down the evaporator until the ambient temperature $(T_A)$ in the refrigerated compartment reaches the desired level $T_O$, without reference to the evaporator temperature itself. This advantageous characteristic does not apply where a thermostatic control is associated only with the evaporator.

Figure 3:
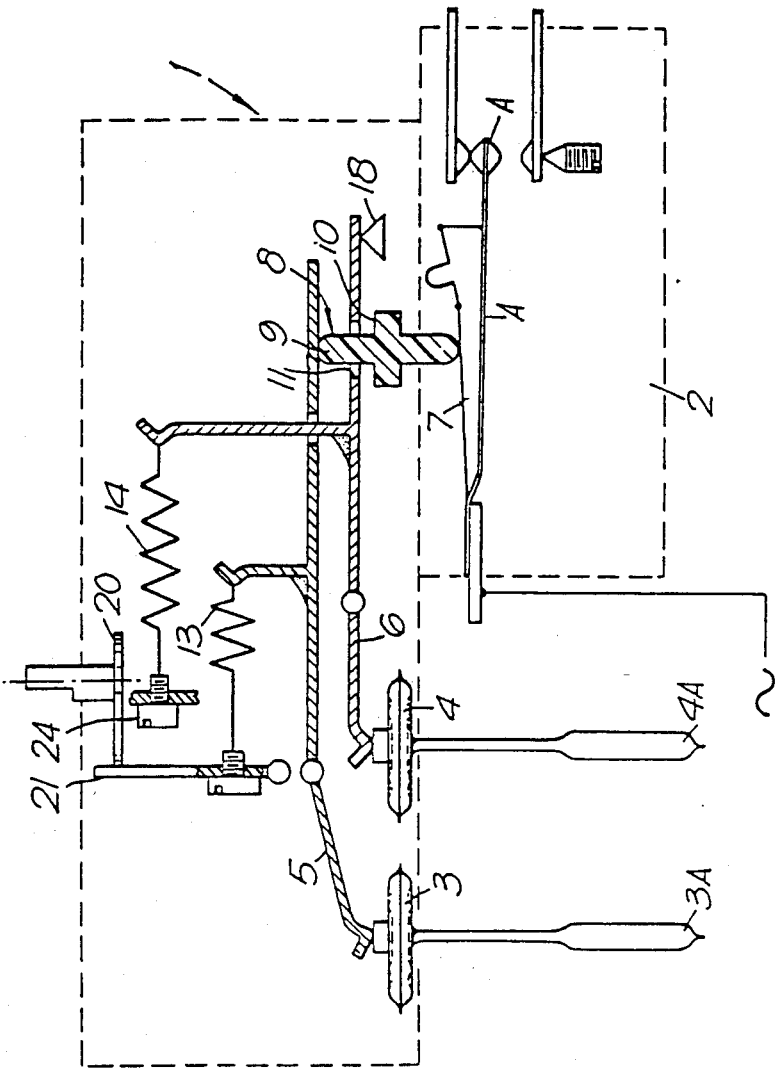
Figure 6:
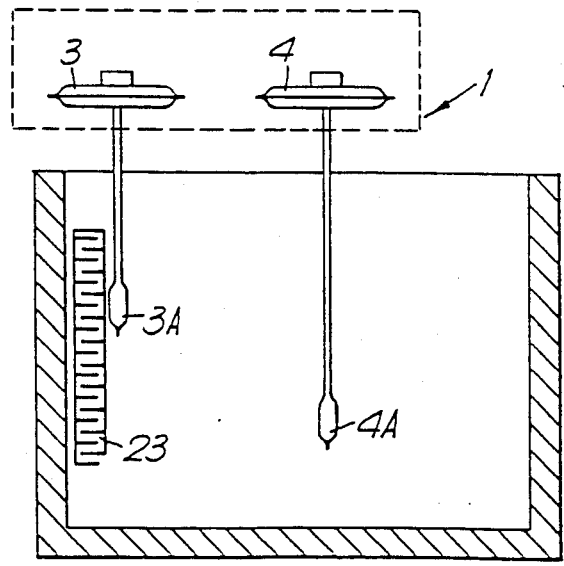
FIG. 6 shows diagrammatically the application of a control unit according to the invention to a freezer.

FIGS. 3 and 6 illustrate the application of the control unit of the invention to a freezer. As in the refrigerator embodiment, the temperature sensing element 3A of the bellows 3 is in cose proximity to the evaporator 23 while the sensing element 4A of the bellows 4 is located in the ambient air within the freezer compartment itself.

In this control unit (FIG. 3) the presetting cam 20 is arranged to adjust the tension in the spring 13 and therefore, the "cut-in" temperature $T_i$, the tension in the spring 14 being independently presettable by means of an adjusting screw 24 to predetermine the "cut-out" temperature $T_O$.

Upon the introduction into the freezer of relatively warm or fresh food the air in the freezer will warm up, and will accelerate the warming up of the evaporator 23, assuming that the compressor is at this stage de-energised. As soon as the evaporator reaches the cut-in temperature the bellows 3 will cause closure of the switch contacts A-B, which will remain closed until the temperature sensed in the freezer compartment by the sensing element 4A reaches the preset "cut-out" temperature $T_O$. This mode of operation results in a prolonged operation of the compressor, until the desired ambient temperature is reached, and is, in effect, an automatically initiated and terminated fast freeze. This clearly has advantages compared with known freezer controls of the kind in which fast freezing has to be initiated and/or terminated by manual operation of an override switch.

The present invention is not applicable exclusively to freezers and refrigerators. In principle the invention is applicable to both heating and cooling systems, the essential characteristics of the invention being the use of two temperature sensing elements, one of which is responsive to the temperature of the heating or cooling means, and the other of which is responsive to an ambient temperature, for example the temperature in a room or the temperature in a freezer or refrigerator compartment, which results from the action of the heating or cooling means, the two temperature sensing elements cooperating with a common switch device to operate the switch in opposite respective senses in response to different respective predetermined or presettable temperatures.

Figure 7:
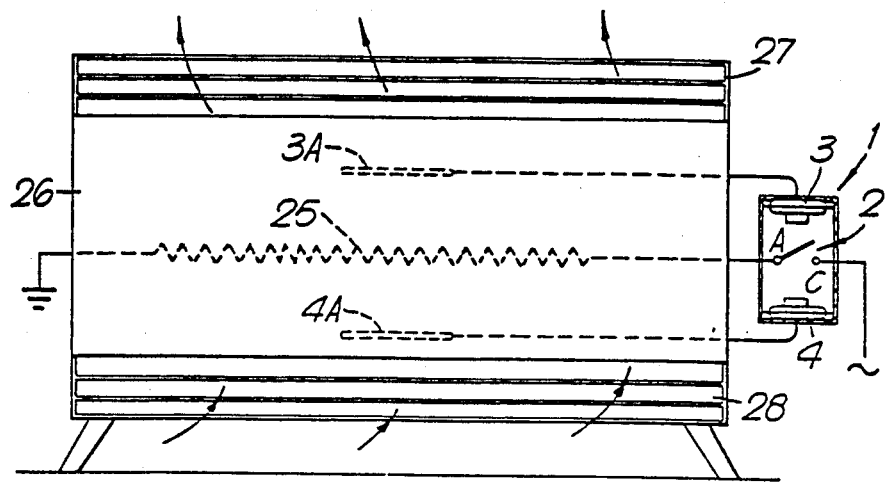
FIG. 7 shows diagrammatically the application of a control unit according to the invention to an electrical space heater.

FIG. 7 illustrates diagrammatically the application of a temperature responsive control unit according to the invention to a convector space heater of the type having an electrical heater element 25 enclosed in a convector housing 26 which is open at its upper and lower ends. A vertical convection current is established in the housing by the action of the heater element 25, hot air leaving the housing to an air outlet 27 at the upper end and being replaced by colder air drawn from the heated enclosure, which enters the housing through an inlet 28 at the lower end. The switch device 2 of the control unit 1 is connected in the power supply to the heater element 25 and the first and second temperature sensing elements 3A, 4A are arranged in the vicinity of the outlet and inlet 27, 28 respectively. Thus the temperature sensing element 4A responds to the temperature of the ambient air entering the housing 26 and cuts-in the heater element 25 by closing the switch contacts A-C (FIG. 1) when the sensed temperature falls below a predetermined threshold level (typically 15°–30° C.). The temperature sensing element 3A arranged in the vicinity of the heater element 25, is arranged to cut-out the heater by opening the contacts A-C of the switch device 2 when its sensed temperature exceeds a predetermined upper limit, typically in the region of 80° C. As a safety feature, the heater element 25 will be switched off automatically by the action of the bellows 3 if, as a result of the air outlet 27 being obstructed in any way, there is a marked temperature increase in the vicinity of the heater element 25. The energisation of the heater element 25 is, however, dependent upon the ambient temperature sensed by the sensing element 4A, and therefore the control unit 1 acts effectively as a proportional energy regulator responsive to ambient temperature.

Figure 8:
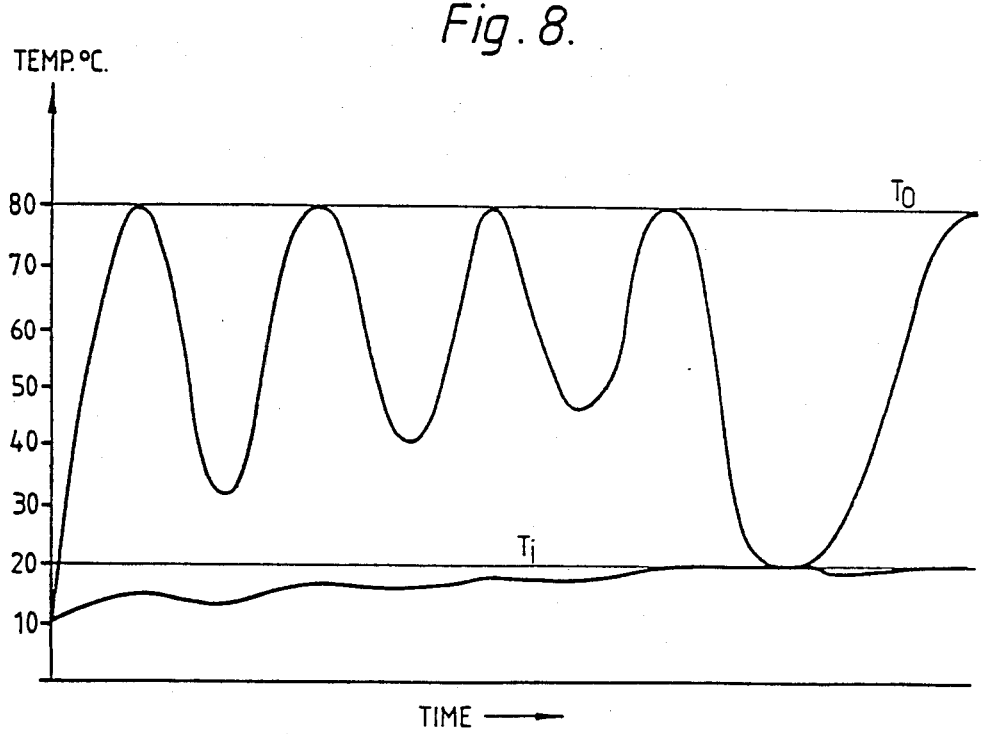
FIG. 8 illustrates graphically the temperature variations with time associated with the space heater shown in FIG. 7.

Typical variations with time of the temperature of the inlet and outlet air of the heater are shown graphically in FIG. 8, together with the cut-in and cut-out threshold temperaturs $T_i$, $T_O$ predetermined by the settings of the anchorages for the tension springs 13 and 14 respectively. It will be seen that upon initial switching on of the heater the temperature sensed by the sensing element 3A rises until the cut out threshold $T_O$ is reached, when the bellows 3 will open the switch contacts A-C and de-energise the heater element 25. If the ambient temperature has not reached the threshold level $T_i$, the bellows 4 will re-close the switch contacts A-C, and this cycling will continue until the ambient temperature reaches a substantially constant level near the cut-in threshold $T_i$. Thus the re-energisation of the heater element 25 occurs when the sensed ambient temperature drops below the desired level, and is terminated automatically by the bellows sensing element 3A in the heater outlet air.

It will be noted that:

(a) the maximum temperature of the outlet air of the heater is limited to a safe level $T_O$, which is arranged to be below a dangerous limit.

(b) the inlet air sensing element 4A is only partially influenced by direct radiation from the heater element 25: in fact the heater element 25 is de-energised for at least some of the time that the sensing element 4A detects a temperature below the cut-in threshold $T_i$, so that the sensing of the ambient air temperature by the sensing element 4A is less prone to interference from the heater element itself than is the case with conventional heater thermostats. This is an important feature since it avoids "anticipation" effects which would otherwise load to inaccuracy of ambient temperature sensing.

I claim:

1. A temperature responsive control unit comprising a first temperature sensing element comprising a bellows system responsive to the temperature of heating or cooling means and a second temperature sensing element comprising a bellows system responsive to an ambient temperature which results from the action of the heating or cooling means a common switch device which is operable in one sense by the first temperature sensing element and in the opposite sense by the second temperature sensing element, said bellows system cooperating with respective operating levers characterised in that the operating lever of the first temperature sensing element acts on an operating element of the switch device through a displaceable member which has a shoulder against which the operating lever of the second temperature sensing element acts, the movement of the latter operating lever in engagement with said shoulder being limited by a stop which effectively prevents operation of the switch in the said one sense by the second temperature sensing element.

2. A control unit according to claim 1, in which the two operating levers are acted upon by respective biassing springs in opposition to the respective temperature sensing elements, the forces exerted by the two springs being independently adjustable.

3. A temperature responsive control unit according to claim 1, applied to a two-door refrigerator having a freezer and a refrigeration compartment with respective evaporators associated therewith, characterised in that the first temperature sensing element (3, 3A) is responsive to the temperature of the freezer evaporator and the second sensing element (4, 4A) is responsive to the temperature of the refrigeration compartment evaporator, so that closure of the switch device to cut-in the compressor occurs when the freezer evaporator reaches an upper threshold temperature and opening of the switch device to cut-out the compressor occurs when the refrigeration compartment evaporator reaches a lower threshold temperature.

4. A temperature responsive control unit according to claim 5, applied to a freezer, characterised in that the first temperature sensing element (3, 3A) is responsive to the temperature of the evaporator of the freezer and the second temperature sensing element (4 4A) is responsive to the air temperature in the freezer compartment, so that the switch device effects automatic cut-out of the compressor when the temperature in the freezer compartment reaches a predetermined low level and automatic cut-in of the compressor after, for example in the introduction of fresh food.

5. A temperature responsive control unit according to any one of claims 1 or 2, for controlling the operation of a space heater (26) having an electrical heater element (25), characterised in that the first temperature sensing element (3, 3A) is responsive to temperature immediately downstream of the heater element (25) and the second temperature sensing element (4, 4A) is responsive to temperature upstream of the heater element.

6. A control unit according to claim 5, characterised in that the switch device (2) is so arranged that it is closed, to switch the heater element (25) on, only by the second temperature sensing element (4, 4A) placed upstream when the latter senses a temperature below a predetermined threshold level, and is opened, to switch the heater element (25) off, only by the first temperature sensing element (3, 3A) placed downstream when the latter senses a temperature in excess of a predetermined upper limit.

7. A temperature responsive control unit for a heating or cooling means comprising:

(a) a first bellows system responsive to an operating temperature of the heating or cooling means;

(b) a second bellows system responsive to an ambient temperature which results from the action of the heating or cooling means;

(c) a switch device operable in one sense to effect initiation of operation of the heating or cooling means and in an opposite sense to effect termination of operation of said heating or cooling means; and, (d) switch operating means for effecting operation of said switch device from said first and second bellows systems comprising:

(i) first and second operating levers respectively associated with said first and second bellows systems; and, (ii) a displaceable switch operating member cooperating with said levers for acting upon said switch device;

(iii) said switch device operated in one sense exclusively by said first bellows system via said first operation level independently of said second bellows system and operated in the opposite sense exclusively by said second bellows system via said second lever system independently of the first temperature sensing element.

8. A control unit according to claim 7, wherein said displaceable member has a shoulder against which the second operating lever acts, and further including a stop which limits the movement of said second operating lever in engagement with said shoulder, effectively preventing operation of the switch in the said one sense by the second bellows system.

9. A control unit according to claim 7 including springs acting on said first and second operating levers in opposition to the respective temperature sensing bellows systems, and means for independently adjusting the forcce exerted by each spring.

10. A temperature responsive control unit according to claim 7, for controlling the operation of refrigerator or freezer equipment having a evaporator, wherein the switch device controls the cutting-in and cutting-out of the refrigerant compressor, the first bellows system being responsive to the temperature in the immediate vicinity of the evaporator, the second bellows system being responsive to air temperature in a freezer or re-grigerator compartment, and the switch device being opened in response to the sensing or a predetermined air temperature by the second bellows system and closed in response to the sensing of a predetermined limit temperature by the first bellows system.

11. A temperature responsive control unit according to claim 7, applied to a refrigerator having a refrigeration compartment with which an evaporator is associated wherein the first bellows system is responsive to the temperature of the evaporator and the second bellows system is responsive to the air temperature within the refrigeration compartment.

* * * * *